Patented Mar. 12, 1935

1,994,271

UNITED STATES PATENT OFFICE 1,994,271

METHOD OF MAKING AN ALKALINE EARTH METAL CARBONATE OF IMPROVED COLOR

John W. Church and Raymond R. McClure, Painesville, Ohio, assignors to Pure Calcium Products Company, Painesville, Ohio, a corporation of Ohio No Drawing. Application February 23, 1933, Serial No. 658,147

6 Claims. (Cl. 134—58)

This invention relates generally to alkaline earth metal carbonates and the method of making the same, and more particularly to alkaline earth metal carbonates having improved color whiteness and to the method of making the carbonate of improved whiteness.

By the term "alkaline earth metal carbonates" it is intended to include calcium carbonate, barium carbonate, strontium carbonate, and magnesium carbonate. Although the invention is applicable to any of these carbonates, it is described herein more particularly as applied to calcium carbonate either in its naturally occurring form as limestone or as produced by any manufacturing process.

Calcium carbonate occurs in nature as limestone in varying degrees of purity. It usually contains, in addition to impurities such as silica and flint, a certain amount of iron which generally is present as the oxide. The iron gives a reddish, yellowish or brownish cast to the calcium carbonate. If the limestone containing iron is ground to a fineness suitable for pigment or filler purposes, the resultant powder in the dry state is apparently lighter in color than the solid stone, but if the powder is wetted, the color reverts back nearly to that of the limestone.

The color of limestone may be improved to a certain extent by the mechanical elimination of coarse impurities and the oxidation of organic impurities. This may be accomplished by calcining the limestone to produce calcium oxide, slaking the oxide, recarbonating to form calcium carbonate, and drying. By this method, however, the discoloration due to iron still persists, resulting usually in a yellow, brown or red cast in the finished product, the degree of discoloration depending upon the amount of iron present in the material.

Due to the fact that iron and calcium compounds possess properties which are very similar, it is difficult to remove the iron economically.

We have found, however, that the discoloring effect of the iron present in the limestone may be greatly minimized and in some cases eliminated by the following procedure in which it is not necessary to resort to the removal of the iron from the calcium carbonate. Instead of removing the iron, it is converted into a form in which it has a less discoloring effect on the calcium carbonate.

The limestone is calcined to convert it into calcium oxide and the oxide is then slaked in hot water. Solid impurities such as silica, flint, unburned limestone, etc., are eliminated by suitable mechanical means such as screening, settling or other types of separation. The calcium hydroxide is reduced to a water slurry containing from 5% to 30% CaO by weight. This slurry is analyzed for iron and an amount of a sulphide ion in suitable form is added to the slurry sufficient to slightly more than satisfy the iron indicated by the analysis. The sulphide ion may be supplied in the form of any soluble salt such, for example, as sodium sulphide, potassium sulfide, ammonium sulfide, or as a gas such as hydrogen sulphide. The addition of the sulphide converts the iron into ferrous sulphide which is blue and possesses much less tinting power than ferric oxide or hydroxide.

It is probably true that due to the high concentration of calcium hydroxide at the time the sulphide is introduced, there is a temporary equilibrium between iron and calcium sulphide if hydrogen sulphide be used, and between iron, calcium and, for instance, sodium sulphides if sodium sulphide be used. In any event, there is little perceptible change in the slurry at the moment of introduction of the sulphide. The mixture is then reacted with a carbonating agent such, for example, as carbon dioxide gas, sodium carbonate, sodium bicarbonate, ammonium carbonate, or any other reactable carbonating agent. As carbonating progresses, the slurry takes on a bluish cast, the extent of the blue coloration being determined by the amount of ferrous sulphide present. The iron present in the slurry either as iron oxide or hydroxide is converted by this process into iron sulphide as the calcium carbonate particles are formed, and it is believed that the iron sulphide is occluded within the calcium carbonate particles as well as being exposed in suspension. The filtered and dried calcium carbonate thus produced possess a greatly improved whiteness and brightness.

It is believed that the improved whiteness and brightness of the calcium carbonate produced by our method is due to the following conditions and reactions occurring in the process, although we do not wish to be bound by our theory. Ferric oxide or hydroxide is brown, red or yellow, depending upon its concentration, and possesses high tinctorial value. Ferrous sulphide (formed by the action of the sulphide ion, which is at the same time a reduction agent) is insoluble in water, is blue, and possesses much less tinting power than ferric oxide or hydroxide. The iron oxide or hydroxide is insoluble in water and is present in the slurry, colloidally dispersed throughout the slurry, and occluded within the particles of calcium hydroxide. Calcium hydroxide is soluble to a small degree and when the sulphide is added, it reacts at first only with the amount of iron released by the dissolving of the small amount of calcium hydroxide. As carbonating proceeds, the calcium carbonate already in solution is precipitated out along with the amount of ferrous sulphide from the iron available. As calcium hydroxide is removed from solution by formation of insoluble calcium carbonate, more calcium hydroxide is dissolved from the undissolved suspended portion and more iron is liberated. These are, in turn, acted upon by the carbonating agent and the sulphide, respectively, and the process proceeds until calcium hydroxide is converted into calcium carbonate, and the iron oxide or hydroxide are converted into ferrous sulphide.

We have described the process particularly as applied to improving the color whiteness and brightness of calcium carbonate. It will be understood, however, that the invention is applicable to the treatment of other alkaline earth metal carbonates as hereinbefore mentioned and that the invention is not limited to the method which has been described in detail, but may be otherwise embodied or practiced within the scope of the following claims.

We claim:

1. The method of producing alkaline earth metal carbonates of improved color, which comprises treating a slurry containing an alkaline earth metal hydroxide and iron in the form of iron oxide or iron hydroxide with a suitable sulphide and carbonating agent in amount sufficient to convert the principal part of the alkaline earth metal hydroxide to carbonate and the iron oxide or hydroxide to iron sulphide.

2. The method of producing calcium carbonate of improved color which comprises treating a slurry containing calcium hydroxide and iron in the form of iron oxide or iron hydroxide with a suitable sulphide and carbonating agent in amount sufficient to convert the principal part of the calcium hydroxide to calcium carbonate and the iron oxide or hydroxide to iron sulphide.

3. The method of improving the whiteness of alkaline earth metal carbonates containing iron compounds, which comprises calcining the carbonate, slaking it and forming a slurry of alkaline earth metal hydroxide, treating the slurry with a suitable sulphide and a suitable carbonating agent, in amount sufficient to convert the principal part of the alkaline earth metal hydroxide into carbonate, and the iron oxide or hydroxide present in the slurry into iron sulphide, removing the precipitate, and drying it.

4. The method of improving the whiteness of calcium carbonate containing iron compounds, which comprises calcining the carbonate, slaking it and forming a slurry of calcium hydroxide, treating the slurry with a suitable sulphide and a suitable carbonating agent in amount sufficient to convert the principal part of the calcium hydroxide into calcium carbonate and the iron oxide or hydroxide present in the slurry into iron sulphide, removing the precipitate, and drying it.

5. The method of improving the whiteness of alkaline earth metal carbonates containing iron compounds, which comprises calcining the carbonate, slaking it and forming a slurry of alkaline earth metal hydroxide, treating the slurry with hydrogen sulphide and a suitable carbonating agent in amount sufficient to convert the principal part of the alkaline earth metal hydroxide into carbonate and the iron oxide or hydroxide present in the slurry into iron sulphide, removing the precipitate, and drying it.

6. The method of improving the whiteness of alkaline earth metal carbonates containing iron compounds, which comprises calcining the carbonate, slaking it and forming a slurry of alkaline earth metal hydroxide, treating the slurry with hydrogen sulphide and then with carbon dioxide gas in amount sufficient to convert the principal part of the alkaline earth metal hydroxide into carbonate and the iron oxide or hydroxide present in the slurry into iron sulphide, removing the precipitate, and drying it.

JOHN W. CHURCH.
RAYMOND R. McCLURE.